United States Patent
Hemmer et al.

(10) Patent No.: US 8,168,150 B2
(45) Date of Patent: May 1, 2012

(54) BINARY, TERNARY AND QUATERNARY LITHIUM PHOSPHATES, METHOD FOR THE PRODUCTION THEREOF AND USE OF THE SAME

(75) Inventors: Reinhard P. Hemmer, Illertissen (DE); Giesela Arnold, Ulm (DE); Christian Vogler, Westerstetten-Vorderdenkental (DE); Margret Wohlfahrt-Mehrens, Illertissen (DE)

(73) Assignee: Zentrum fur Sonnenenergie-und Wasserstoff-Forschung Baden-Wurttenberg, Gemeinnutzige Stiftung, Ulm (DE)

( * ) Notice: Subject to any disclaimer, the term of this patent is extended or adjusted under 35 U.S.C. 154(b) by 483 days.

(21) Appl. No.: 10/474,555
(22) PCT Filed: Apr. 10, 2002
(86) PCT No.: PCT/DE02/01323
§ 371 (c)(1),
(2), (4) Date: Apr. 7, 2004
(87) PCT Pub. No.: WO02/083555
PCT Pub. Date: Oct. 24, 2002

(65) Prior Publication Data
US 2004/0151649 A1    Aug. 5, 2004

(30) Foreign Application Priority Data
Apr. 10, 2001 (DE) .................. 101 17 904

(51) Int. Cl.
*H01M 4/58* (2010.01)
*C01B 25/30* (2006.01)
(52) U.S. Cl. ............... 423/306; 423/179.5; 429/218.1; 429/221; 429/224; 429/231.1; 429/231.2; 252/520.2; 252/521.2
(58) Field of Classification Search ............... 252/182.1, 252/500, 518.1, 519; 429/220, 221, 223, 429/231.1, 231.3, 231.5, 231.6, 231.95
See application file for complete search history.

(56) References Cited

U.S. PATENT DOCUMENTS
5,871,866 A    2/1999    Barker et al.
(Continued)

FOREIGN PATENT DOCUMENTS
AU    200193568    4/2002
(Continued)

OTHER PUBLICATIONS

Padhi et al, "Phospho-Olivines as Positive-Electrode Materials for Rechargeable Lithium Batteries," J. Electrochem. Soc., 1997,144(4), pp. 1188-1194.*

(Continued)

*Primary Examiner* — Stanley Silverman
*Assistant Examiner* — Kallambella Vijayakumar
(74) *Attorney, Agent, or Firm* — The Nath Law Group; Tanya E. Harkins; Mihsuhn Koh

(57) ABSTRACT

The invention relates to binary, ternary and quaternary lithium phosphates of general formula $Li(Fe_xM^1{}_yM^2{}_z)PO_4$ wherein $M^1$ represents at least one element of the group comprising Sc, Ti, V, Cr, Mn, Co, Ni, Cu, Zn, Be, Mg, Ca, Sr, Ba, Al, Zr, and La; $M^2$ represents at least one element of the group comprising Sc, Ti, V, Cr, Mn, Co, Ni, Cu, Zn, Be, Mg, Ca, Sr, Ba, Al, Zr, and La; x=between 0.5 and 1, y=between 0 and 0.5, z=between 0 and 0.5, provided that x+y+z=1, or x=0, y=1 and z=0. The said lithium phosphates can be obtained according to a method whereby precursor compounds of elements Li, Fe, $M^1$ and/or $M^2$ are precipitated from aqueous solutions and the precipitation product is dried in an inert gas atmosphere or a reducing atmosphere at a temperature which is between room temperature and approximately 200° C. and tempered at a temperature of between 300° C. and 1000° C. The inventive lithium phosphates have a very high capacity when used as cathode material in lithium accumulators.

2 Claims, 5 Drawing Sheets

U.S. PATENT DOCUMENTS

| | | | |
|---|---|---|---|
| 5,910,382 A | | 6/1999 | Goodenough et al. |
| 6,085,015 A * | | 7/2000 | Armand et al. ............... 385/140 |
| 6,451,487 B1 * | | 9/2002 | Besner et al. ................ 429/304 |
| 6,656,635 B2 * | | 12/2003 | Okawa et al. ................ 429/221 |
| 6,730,281 B2 * | | 5/2004 | Barker et al. ................ 423/306 |
| 6,855,273 B2 * | | 2/2005 | Ravet et al. .................. 252/506 |
| 2004/0033360 A1 * | | 2/2004 | Armand et al. ............... 428/408 |

FOREIGN PATENT DOCUMENTS

| | | | |
|---|---|---|---|
| AU | 200193569 | | 4/2002 |
| CA | 2 320 661 A1 | | 3/2002 |
| CA | 2320661 | * | 3/2002 |
| CA | 2 358 256 | | 4/2002 |
| DE | 101 17 904 A1 | | 10/2002 |
| EP | 1 193 782 A2 | | 4/2002 |
| EP | 1 261 050 A1 | | 11/2002 |
| JP | 2002 117831 A | | 4/2002 |
| WO | 96/10538 | | 4/1996 |
| WO | 97/40541 | | 10/1997 |
| WO | 01/53198 A1 | | 7/2001 |
| WO | 02/27824 A1 | | 4/2002 |
| WO | 02/099913 A1 | | 12/2002 |

OTHER PUBLICATIONS

Croce, F., et al., "A Novel Concept for the Synthesis of an Improved $LiFePO_4$ Lithium Battery Cathode", *Electrochemical and Solid-State Letters*, vol. 5, No. 3, pp. A47-A50, (2002).

Yang, S., et al., "Hydrothermal synthesis of lithium iron phosphate cathodes", *Electrochemistry Communications*, vol. 3, pp. 505-508, (2001).

Huang, H. et al., "Approaching Theoretical Capacity of $LiFePO_4$ at Room Temperature at High Rates", *Electrochemical and Solid-State Letters*, vol. 4 (10) pp. A170-A172 (2001).

Padhi, A.K., et al., "Phospho-olivines as Positive-Electrode Materials for Rechargeable Lithium Batteries", *J. Electrochem. Soc.*, vol. 144, No. 4, pp. 1188-1194, (Apr. 1997).

Anderson, A.S., et al., "Lithium extraction/insertion in LiFePO4: an X-ray diffraction and Mossbauer spectroscopy study" Solid State Ionics, vol. 130, pp. 41-52, (2000).

* cited by examiner

BINARY, TERNARY AND QUATERNARY LITHIUM PHOSPHATES, METHOD FOR THE PRODUCTION THEREOF AND USE OF THE SAME

FIELD OF THE INVENTION

The present invention relates to binary, ternary and quaternary lithium phosphates, specifically lithium iron phosphates, a process for their manufacture through precipitation from aqueous solutions and their use as cathode material in lithium accumulators, specifically secondary lithium batteries.

STATE OF THE ART

Lithium iron phosphate causes reversible de-insertion of lithium ions with an electrochemical potential of approximately 3.5 V versus Li/Li+. The theoretical specific capacity measures 170 mah/g. The capacity of the known lithium iron phosphates at room temperature is, however, low and normally measures only 70- to 100 mAh/g. The reversible electrochemical exsertion of lithium ions has hitherto been observed, in addition to for lithium iron phosphates, only for lithium iron manganese phosphate mixed crystals and lithium cobalt phosphates. Lithium iron manganese phosphate mixed crystals show two potential plateaus at 3.5 V and at 4 V versus Li/Li+ and a reversible specific capacity of maximum 70 mAh/g. Lithium cobalt phosphate shows a flat potential plateau at 4.8 V versus Li/Li+ with a reversible capacity of maximum 110 mAh/g.

All hitherto described processes for the manufacture of lithium iron phosphate and other phospho-olivines can be considered as solid-state processes. Some examples in this regard are those processes described in WO 97/40541, U.S. Pat. No. 5,910,382 or WO 00/60680. These solid-state processes generally entail a blending of pulverised base materials primarily by means of wet or dry refining, before they are subjected to heat treatment for their chemical transformation. The reaction product that is gained in the form of a sinter cake or granulate must then generally be broken, ground and graded, before a technically processable product can be obtained. The disadvantages of solid-state processes are the high sinter temperatures and long furnace times that are often necessary for total chemical transformation, and which lead to high energy costs and low flow rates. Grinding processes also increase the risk of impurities occurring, which can often be critical, particularly in the case of electrochemical applications. In addition, the broad particle size distributions caused by the grinding process generally necessitate a grading of the product, which can also lead to material losses.

OBJECT OF THE INVENTION

The invention is therefore based on the object of providing lithium phosphates that show high specific capacity in their electrochemical applications, even at room temperature. It is also aimed at providing a simple and inexpensive process for their manufacture.

SUMMARY OF THE INVENTION

The above object is achieved by binary, ternary and quaternary lithium phosphates, possibly in a matrix containing homogenously distributed carbon particles, in accordance with the general formula $Li(Fe_xM^1{}_yM^2{}_z)PO_4$ wherein $M^1$ represents at least one element of the group comprising Sc, Ti, V, Cr, Mn, Co, Ni, Cu, Zn, Be, Mg, Ca, Sr, Ba, Al, Zr, and La, and $M^2$ represents at least one element of the group comprising Sc, Ti, V, Cr, Mn, Co, Ni, Cu, Zn, Be, Mg, Ca, Sr, Ba, Al, Zr, and La, with x=between 0.5 and 1, y=between 0 and 0.5, z=between 0 and 0.5, provided that x+y+z=1, or x=0, y=1 and z=0, the lithium phosphates being obtainable according to a method whereby precursor compounds of elements Li, Fe, $M^1$ and/or $M^2$ are precipitated from aqueous solutions and the precipitation product is then dried in an inert gas atmosphere or a reducing atmosphere at a temperature which is between room temperature and approximately 200° C. and tempered at a temperature of between 300° C. and 1000° C. The lithium phosphate particles may have an average particle size of less than approx. 6μm, preferably less than approx. 3μm. Preferred or particularly practical embodiments of the subject of the application are disclosed in the subclaims.

The subject of the invention is therefore binary, ternary and quaternary lithium phosphates of general formula

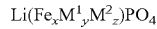

$$Li(Fe_xM^1{}_yM^2{}_z)PO_4$$

wherein $M^1$ represents at least one element of the group comprising Sc, Ti, V, Cr, Mn, Co, Ni, Cu, Zn, Be, Mg, Ca, Sr, Ba, Al, Zr, and La, and $M^2$ represents at least one element of the group comprising Sc, Ti, V, Cr, Mn, Co, Ni, Cu, Zn, Be, Mg, Ca, Sr, Ba, Al, Zr, and La, with x=between 0.5 and 1, y=between 0 and 0.5, z=between 0 and 0.5, provided that x+y+z=1, or x=0, y=1 and z=0, the said lithium phosphates being obtainable according to a method whereby precursor compounds of elements Li, Fe, $M^1$ and/or $M^2$ are precipitated from aqueous solutions and the precipitation product is then dried in an inert gas atmosphere or a reducing atmosphere at a temperature which is between room temperature and approximately 200° C. and tempered at a temperature of between 300° C. and 1000° C.

One further subject of the invention is a process for the manufacture of these lithium phosphates characterised by precursor compounds of elements Li, Fe, $M^1$ and/or $M^2$ being precipitated from aqueous solutions, and with the precipitation product then being dried in an inert gas atmosphere or a reducing atmosphere at a temperature which is between room temperature and approximately 200° C. and tempered at a temperature of between 300° C. and 1000° C.

The subject of the invention is furthermore the use of the inventive lithium phosphates as cathode material in lithium accumulators, preferably secondary (rechargeable) lithium batteries.

DETAILED DESCRIPTION OF THE INVENTION

One surprising result of the invention is that the inventive process succeeded in producing novel lithium phosphates with a special surface structure, low particle size and a narrow particle size distribution. Lithium phosphates in accordance with the invention show a capacity, measured at room temperature, when used in lithium accumulators of up to approx. 155 mAh/g, which is more than 90% of the theoretical value of 170 mah/g, whereas comparable lithium phosphates manufactured by means of regular solid-state processes show capacities of up to only approx. 100 mAh/g.

In a preferred embodiment, the phosphate matrix of the inventive lithium phosphates contains carbon particles with homogenous distribution, which leads to a significant increase in their conductibility, enhanced processing, for example, by means of rolling, extrusion with suitable escort substances, as well as a reduction of particle agglomeration.

The inventive lithium phosphates furthermore show preferably an average particle size of less than approximately 6 μm, preferably less than approx. 3 μm. The surfaces measured according to the BET method are generally approx. 2 m$^2$/g. The lithium phosphates obtained on the basis of the inventive process are furthermore for the most part of pure phase as they contain, for example, less than 2% iron phosphate.

The inventive lithium phosphates are manufactured by means of a wet precipitation reaction in an aqueous medium, which in itself is state of the art. Suitable base materials are soluble lithium salts, irons salts and soluble salts of the elements M$^1$ and M$^2$ as well as soluble phosphates of lithium or ammonium.

Setting and maintaining a suitable pH value of the aqueous solution during the precipitation reaction, a suitable choice of temperature, by application of additives influencing viscosity and influencing the blending conditions can have a decisive effect on particle form and particle size of the phosphates in line with the desired material characteristics. Varying the stoichiometry of the applied salts allows the ratio of different elements within the phosphates to be set at practically any possible values. Additional application of lithium hydroxide can have a positive influence on the pH value of the reaction medium.

According to the invention, the iron in the lithium iron phosphates can also be replaced by at least one of the elements Sc, Ti, V, Cr, Mn, Co, Ni, Cu, Zn, Be, Mg, Ca, Sr, Ba, Al, Zr, and La.

The precursor materials obtained from the inventive precipitation reaction are first of all dried to a humidity rate of preferably <5%, and then tempered at a temperature of between 300° C. and 1000° C., wherein this tempering takes place under significantly milder conditions and, above all, in shorter periods than is the case with comparable solid-state reactions. During drying and tempering at high temperatures, an atmosphere of inert gas, for example nitrogen or argon, is used, and it is advantageous if the inert gas atmosphere receives additional slight amounts of, for example, hydrogen as a reducing gas, in order to provide a reducing atmosphere.

In one variation of the inventive process, it is not necessary to isolate the precipitation product and to dry it prior to the tempering operation. It is also possible to vaporise the water part from the suspension containing the precipitation product and then to subject the residue to a continuous drying and tempering treatment with application of an inert gas atmosphere or a reducing atmosphere. This treatment can consist, for example, of a continuos phase of increasing temperature from room temperature to between 600° C. and 1000° C. and preferably between 600° C. and 750° C., a phase where this increased temperature is maintained and a third phase for recooling to room temperature.

The precipitation and/or the drying and tempering preferably takes place in the presence of additives, preferably organic compounds, which under drying and tempering conditions are transformed into matter that improve the processing and electrical material characteristics of the lithium phosphates. Of particular importance for such purposes are additives that lead to carbon particles in the phosphate matrix with homogenous distribution after the drying and tempering process. Some examples of suitable additives in this regard are polyalkylene glycols, such as polyethylene glycols, starch or starch derivatives, sugar or sugar derivatives, such as lactose, mono- or poly-carboxylic acids or their derivatives, in particular polyhydroxycarboxylic acids, such as citric acids. Preferred additives are characterised by their ability to function, under the applied tempering conditions, also as an intrinsic reduction means, in addition to their characteristics as material enhancers (see example 4 below).

SHORT DESCRIPTION OF THE DRAWINGS

EXAMPLES

Example 1

Manufacture of LiFePO$_4$

From 0.52 mol (54.26 g) of lithium dihydrogen phosphate and 0.4 mol (111.21 g) of iron (II) sulfate heptahydrate, each dissolved in 400 ml of anaerobic demineralized water, a mixture with homogenous dispersion is manufactured when blended in an atmosphere of inert gas. A previously anaerobic aqueous solution of 0.85 mol (35.70 g) of lithium hydroxide monohydrate, dissolved in 200 ml of demineralized water, is trickled into this mixture over a period of 15 minutes while being stirred at room temperature. This leads, with strict exclusion of oxygen, to a white, lightly settling suspension.

The suspension is filtered in a nitrogen atmosphere and washed free of sulphate with a total of 500 ml anaerobic demineralized water.

The precursor, obtained as a white filter cake, consists of lithium-o-phosphate and vivianite (Fe$_3$(PO$_4$)$_2$ hydrate) and is dried initially in nitrogen at 150° C.

For transformation to the triphyline phase in the nitrogen stream, the homogenous phosphate mixture is initially heated, from the outset room temperature and commencing with a heating rate of 2 K/min, to a target temperature of 650° C., which temperature is maintained for 12 hours, and then heated at the same heating rate up to a final temperature of 675° C. This temperature is maintained for a further 12 hours.

Figure 1:
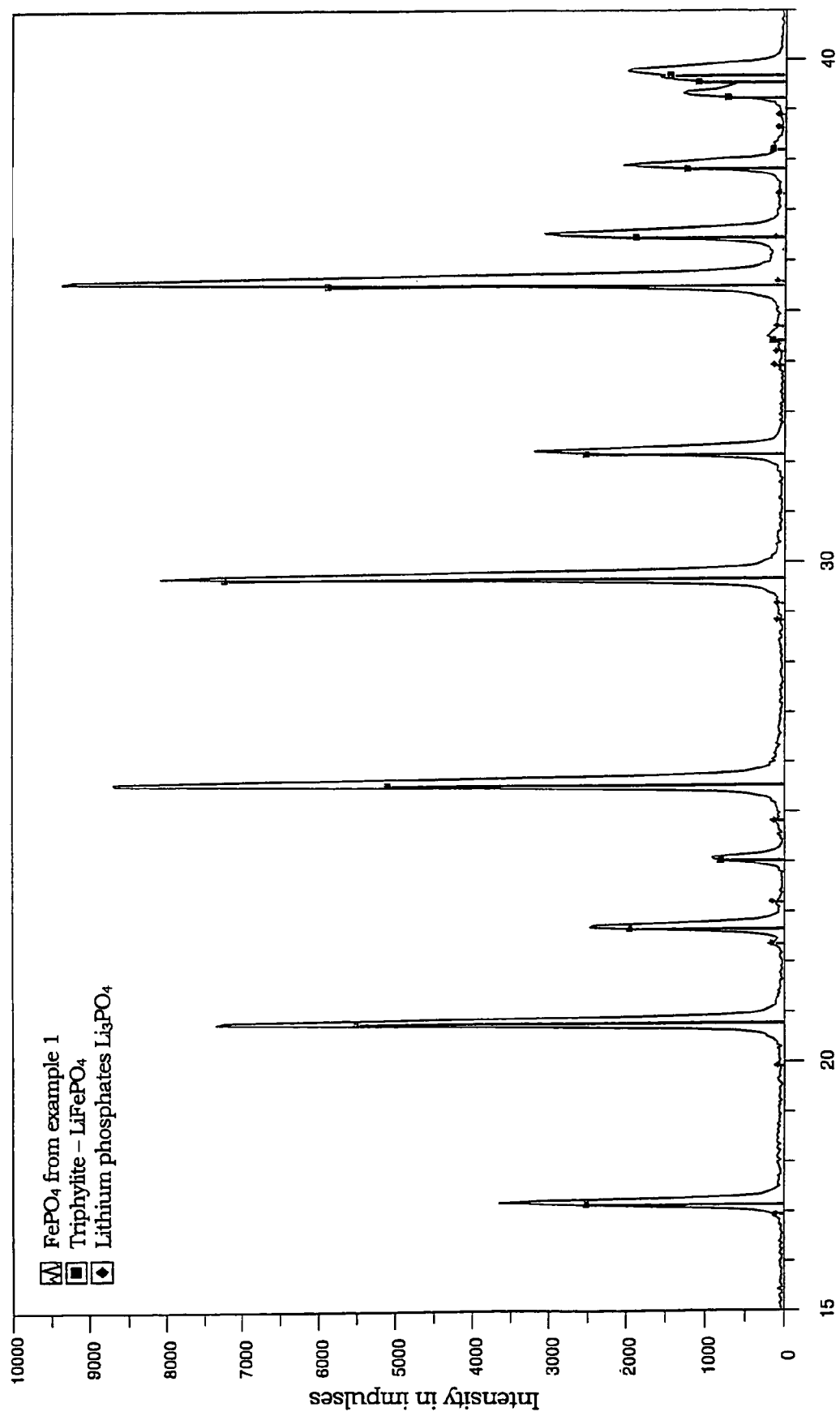
FIG. 1 shows the x-ray diffraction diagram of the lithium iron phosphate manufactured according to example 1.

FIG. 1 shows the x-ray diffraction diagram of the lithium iron phosphate obtained through this process. The diagrams of pure triphylite (LiFePO$_4$) and of pure lithium phosphate (Li$_3$PO$_4$) are also shown as a basis for comparison. It can be seen that the inventive lithium iron phosphate has almost an entirely pure phase.

Figure 2:
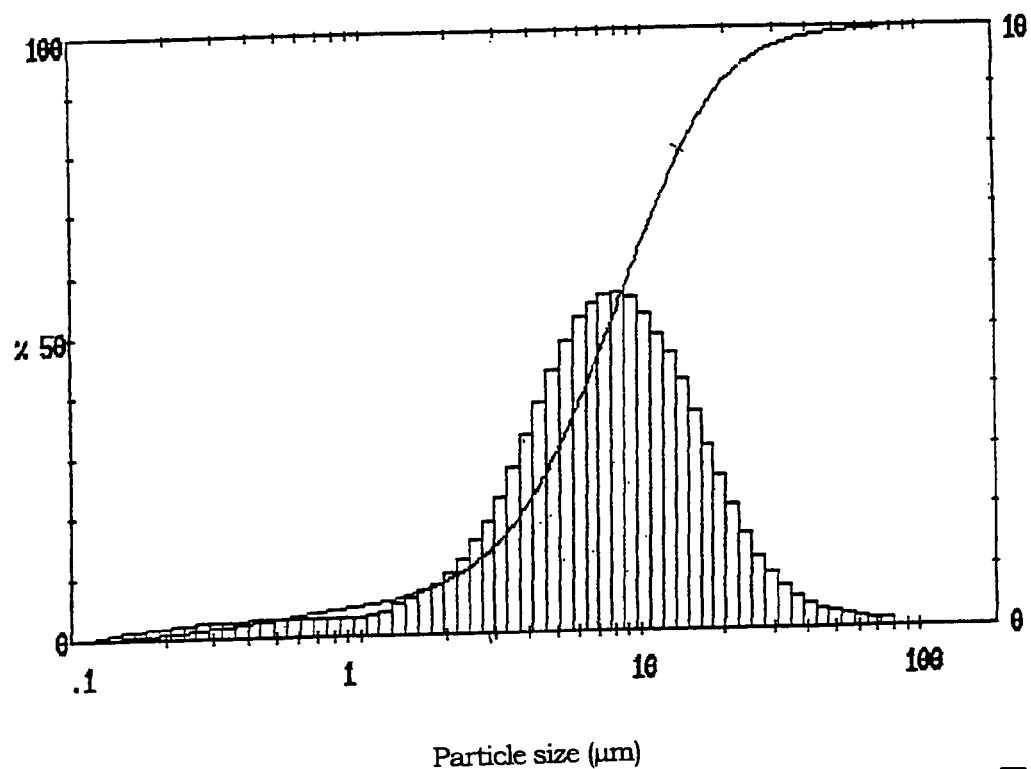
FIGS. 2-5 show the results of the particle size analyses of the lithium phosphates manufactured according to examples 1 to 4.

The analysis of the particle sizes of the lithium iron phosphate received is shown in FIG. 2. The particle sizes are measured by means of a light scattering method using standard equipment (Malvern Instruments SBOD). The resulting average particle size is 2.25 μm with a narrow distribution of particle size.

Example 2

Manufacture of LiFe$_{0.98}$Mn$_{0.02}$PO$_4$

From 0.13 mol (13.57 g) of lithium dihydrogen phosphate, dissolved in 100 ml of demineralized water, and a solution of 0.098 mol (27.25 g) of iron (II) sulfate heptahydrate and 0.002 mol (0.34 g) of manganese sulfate monohydrate in 100 ml of demineralized water, a homogenous mixture is manufactured under stirring and in an atmosphere of protective gas. A previously anaerobic aqueous solution of 0.212 mol (8.94 g) of lithium hydroxide monohydrate, dissolved in 50 ml of demineralized water, is trickled into this mixture over a period of 4 minutes while being stirred at room temperature.

The white suspension is filtered in a nitrogen atmosphere and washed free of sulphate with a total of 150 ml of anaerobic demineralized water.

The white filter cake is dried in an nitrogen atmosphere at 130° C.

The phosphate mixture obtained in this way is heated to a final temperature of 675° C. for its transformation to the triphyline phase in a nitrogen atmosphere, to which 1 volume % hydrogen is added as reducing agent. Heating commences with room temperature and rises at a heating rate of 3 K/min. This final temperature is maintained for 12 hours. The addition of hydrogen/nitrogen is continued during the entire tempering process.

Figure 3:
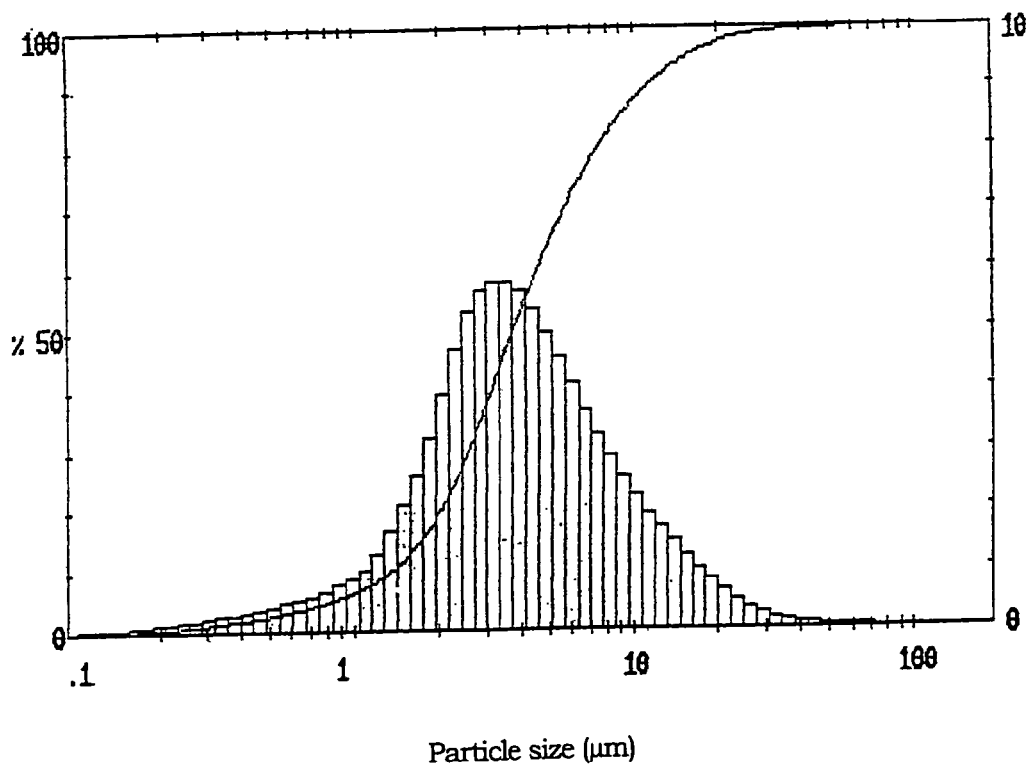

The analysis of the particle sizes of the lithium iron manganese phosphate obtained according to the above process is shown in FIG. 3. The average particle size is 2.63 µm with a very narrow distribution of particle size.

Example 3

Manufacture of LiFePO$_4$ with Use of Additives

A homogenous mixture is manufactured from 0.065 mol (6.78 g) of lithium dihydrogen phosphate, dissolved in 50 ml of anaerobic 20% aqueous solutions of polyethylene glycol 20000 and a similarly anaerobic solution of 0.05 mol (13.90 g) of iron (II) sulfate heptahydrate in 60 ml of a 20% aqueous solutions of polyethylene glycol 20000, under constant stirring. A previously anaerobicized aqueous solution of 0.106 mol (4.47 g) of lithium hydroxide monohydrate, dissolved in 25 ml of demineralized water, is trickled into this mixture over a period of 3 minutes while being stirred at room temperature. The resulting stable, white suspension is broken by the addition of 500 ml of anaerobic ethanol (99.6%). Thereafter, the sediment is centrifugated (3,000 rpm) under a nitrogen atmosphere, and the bottom product is washed free of sulphate with a total of 200 ml of anaerobic demineralised water, and then dried under nitrogen at 150° C.

The phosphate mixture obtained in this way is heated to a final temperature of 675° C. for its transformation to the triphyline phase in a nitrogen atmosphere, to which 10 volume % hydrogen is added as reducing agent. Heating commences with room temperature and rises at a heating rate of 3 K/min. This final temperature is maintained for 12 hours. The addition of hydrogen/nitrogen is continued during the entire tempering process.

Figure 4:
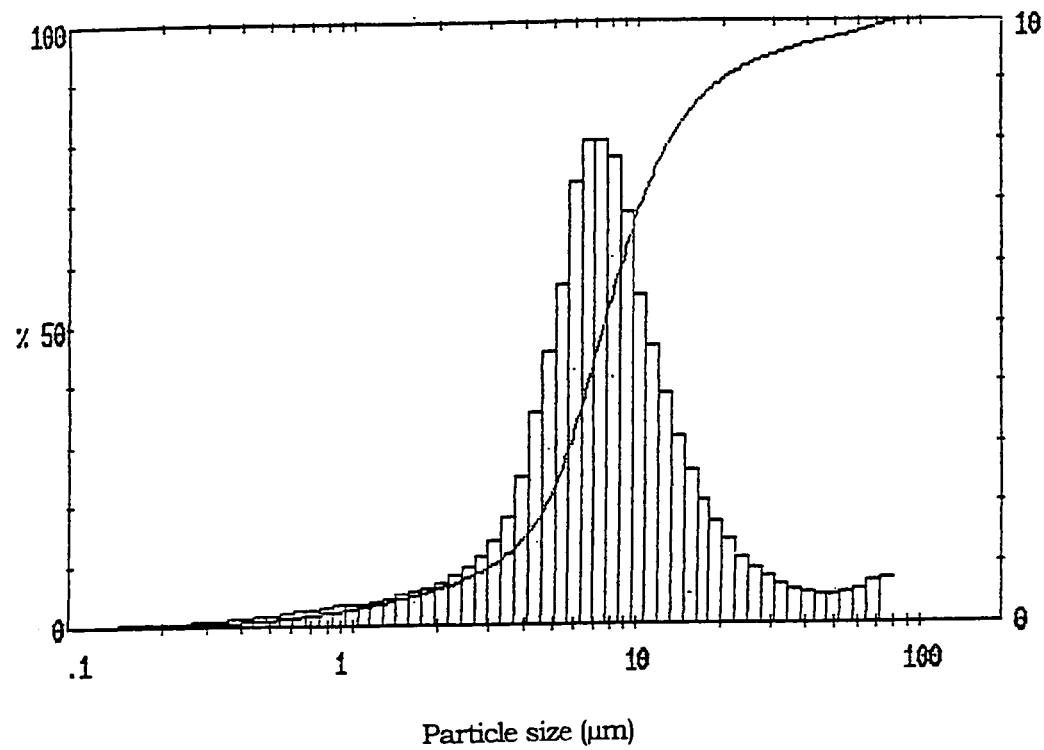

The analysis of the particle sizes of the lithium iron phosphate obtained according to the above process is shown in FIG. 4. The average particle size is 2.19 µm with a very narrow distribution of particle size.

Example 4

Manufacture of LiFePO$_4$ with Carbon Content by Impregnation with Lactose

From 0.13 mol (13.57 g) of lithium dihydrogen phosphate and 0.1 mol (27.80 g) of iron (II) sulfate heptahydrate a homogenous mixture is manufactured with stirring in 200 ml demineralized water (as in example 1). A previously anaerobicized aqueous solution of 0.212 mol (8.94 g) of lithium hydroxide monohydrate, dissolved in 50 ml of demineralized water, is trickled into this mixture over a period of 4 minutes, with the mixture being stirred at room temperature. This results in a white, lightly settling suspension with strict exclusion of oxygen.

The suspension is filtered in a nitrogen atmosphere and washed free of sulphate with a total of 100 ml anaerobic demineralized water.

A homogenous, viscid slip is manufactured from the white filter cake with the addition of 20 g of a 10% lactose solution. Following this impregnation, the mixture is dried in a nitrogen atmosphere at 150° C.

For transformation to the triphyline phase, the homogenous phosphate lactose mixture is heated, starting with the outset room temperature and with heating rate of 3 K/min to a target temperature of 725° C. in a nitrogen atmosphere. This final temperature is maintained for 12 hours. The addition of nitrogen is continued during the entire tempering process.

Figure 5:
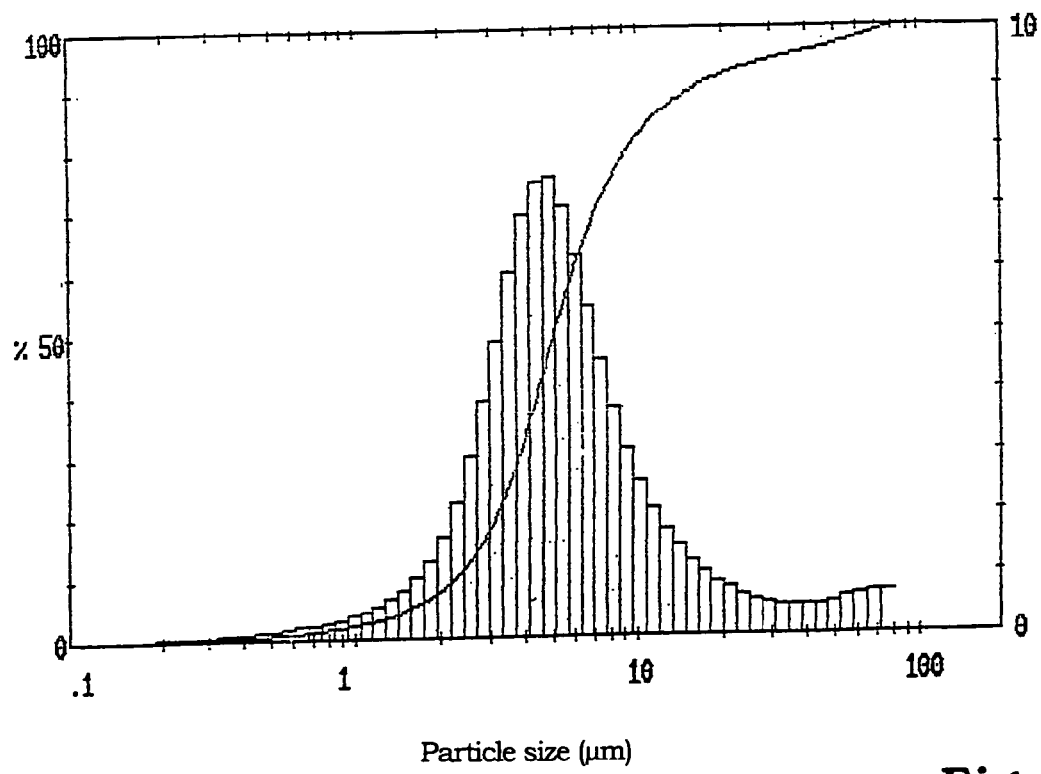

The analysis of the particle sizes of the lithium iron phosphate obtained according to the above process is shown in FIG. 5. The average particle size is 2.70 µm with a very narrow distribution of particle size.

Figure 6:
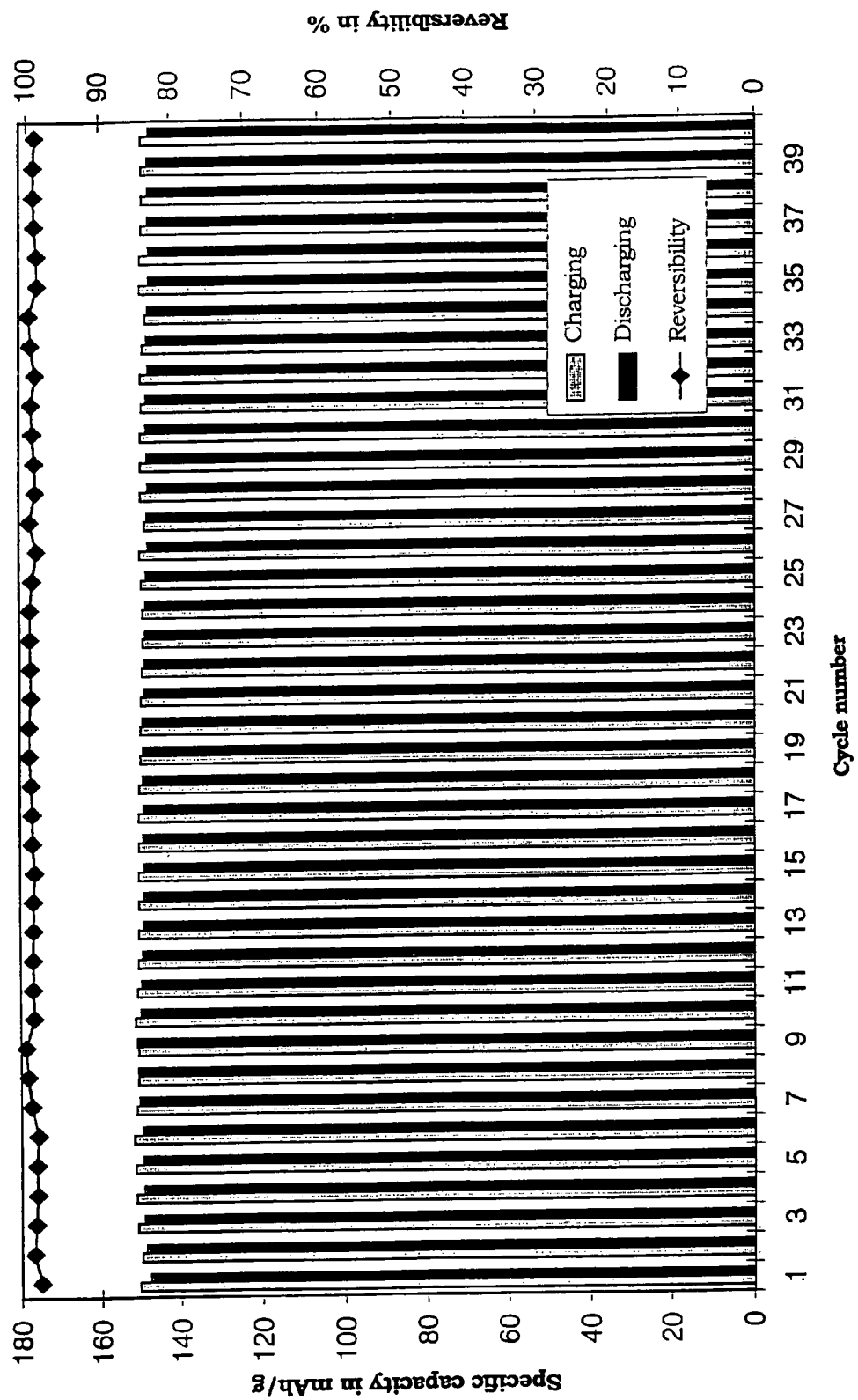
FIG. 6 shows the cyclic behaviour observed in charging and discharging the lithium phosphate manufactured according to example 4, when this is used as cathode material in a lithium accumulator.

The lithium iron phosphate obtained as shown above was used as cathode material in a lithium accumulator. FIG. 6 shows the dependence of the specific capacity in repeated charging and discharging of the battery. The galvanostatic electrochemical measurement was carried out in a glass cell filled with liquid electrolyte (LP30 manufactured by Merck) in 3-electrode arrangement with counter- and reference electrodes made of lithium metal. The current strength measured a constant ±0.26 mA, which corresponds to an area-related current density of 0.26 mA/cm$^2$ or a theoretical charging/discharging rate of capacity (C)/20 h. The potential limits were 2.9 V and 4.0 V versus Li/Li+. As can be seen, no cycle losses occurred after 40 cycles, which indicates excellent reversibility of the inventive lithium iron phosphate.

Figure 7:
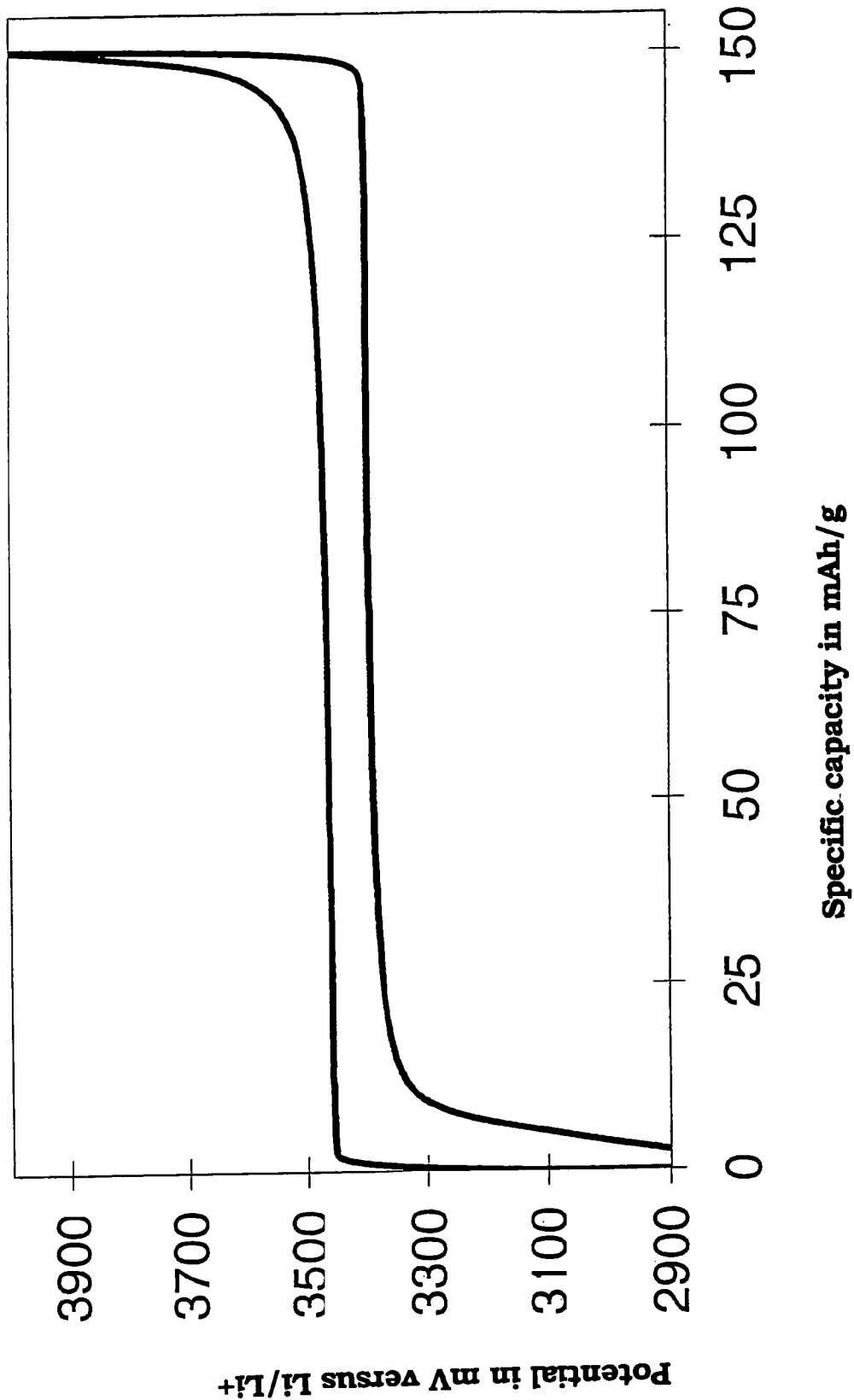
FIG. 7 shows the charging-discharging curve for the first cycle of the measurement for FIG. 6.

Finally, FIG. 7 shows the charging-discharging curve for the first cycle of the measurement described for FIG. 6.

Example 5

Manufacture of LiFePO$_4$ with Carbon Content by Impregnation with Lithium Citrate 100 ml of a solution of 0.05 mol (19.61 g) ammonium iron (II) sulfate heptahydrate, dissolved in demineralized anaerobic water, is poured in 100 ml of a solution of 0.25 mol (33.04 g) of di-ammonium hydrogen phosphate in anaerobic water under constant stirring within 1 minute. After a further 5 minutes stirring and with strict exclusion of oxygen, a white, quickly settling suspension is obtained. This suspension is filtered in a nitrogen atmosphere, washed free of sulphate with anaerobic water and dried at 75° C. The dried precipitation product consists exclusively of spherical powder particles (diameter <5 µm) of the phase ammonium iron (II) phosphate monohydrate.

For further transformation into lithium iron phosphate, 0.025 mol (4.67 g) of the precipitated ammonium iron (II) phosphate monohydrate is added to 5 ml of a solution of 0.00875 mol (2.47 g) of tri-lithium citrate tetrahydrate—neutralised with citric acid—in anaerobic demineralized water and stirred to a homogenous, fluid suspension. With constant stirring, the suspension is carefully heated without boiling and the water part vaporised, until the suspension forms threads and solidifies during cooling into a caramel-type viscous mass. This mass is then subjected to drying and tempering treatment in a nitrogen atmosphere. This treatment consists of a 6-hour heating phase, in which the mass is heated from room temperature to 675° C., a temperature maintenance phase of 12 hours at 675° C. and a six-hour cooling phase. The resulting porous, hard sinter cake is broken in an agate mortar and ground, until a smooth, flowing black powder is obtained. The tempering product consists of LiFePO$_4$ (Triphyline) and small quantities of additives (<3%) of lithium phosphate (Li$_3$PO$_4$) and iron phosphide (FeP). This product contains approximately 10 volume % of amorphous carbon.

Example 6

Manufacture of LiFePO$_4$ by Impregnation with Lithium Acetate 0.025 ml (4.67 g) of the precipitated ammonium iron (II) phosphate monohydrate from example 5 is added to 2 ml of a solution of 0.0265 mol (2.68 g)—neutralised with citric acid—of lithium acetate di-hydrate in anaerobic demineralized water and stirred to a homogenous suspension. With constant stirring, the suspension is carefully heated without boiling and the water part vaporised, until the suspension solidifies during cooling into a crumbly, bright green mass. This mass is then subjected to a drying and tempering treatment in a nitrogen atmosphere. This treatment consists of a 6-hour heating phase, in which the mass is heated from room temperature to 675° C., a temperature maintenance phase of 12 hours at 675° C. and a six-hour cooling phase. The resulting granulate is ground in an agate mortar, until a bright grey powder is obtained. The tempering product consists of LiFePO$_4$ (Triphyline) and additives of lithium phosphate (Li$_3$PO$_4$), magnetite (Fe$_3$O$_4$), and wuestite (FeO). This product contains no carbon.

The invention claimed is:

1. A method of preparing binary, ternary or quaternary lithium phosphate composites with carbon particles, wherein said lithium phosphate has a general formula:

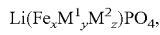

wherein M$^1$ represents at least one element selected from the group consisting of Sc, Ti, V, Cr, Mn, Co, Ni, Cu, Zn, Be, Mg, Ca, Sr, Ba, Al, Zr, and La, M$^2$ represents at least one element selected from the group consisting of Sc, Ti, V, Cr, Mn, Co, Ni, Cu, Zn, Be, Mg, Ca, Sr, Ba, Al, Zr, and La, and either
a) x=between 0.5 and 1,
y=between 0 and 0.5,
z=between 0 and 0.5, provided that x+y+z=1; or
b) x=0,
y=1,
z=0, and said carbon particles are present within the phosphate matrix of said lithium phosphate with a homogeneous distribution, the method comprising:

precipitating precursor compounds of elements Li, Fe, M$^1$ and/or M$^2$ from aqueous solutions to obtain a precipitation product;

drying the precipitation product in an inert gas atmosphere or a reducing atmosphere at a temperature of from about room temperature to about 200° C. to obtain a dried precipitation product; and tempering the dried precipitation product at a temperature of from about 300° C. and 1000° C. to produce the lithium phosphates;

wherein the precipitation and/or the drying and tempering is taking place in the presence of additives, which under drying and tempering conditions, are transformed into matter that improves the processing and electrical materials characteristics of the lithium phosphate;

wherein the additives used lead to a homogeneous distribution of carbon particles in the phosphate matrix after the drying and tempering process; and wherein the additives comprise one or more members selected from the group consisting of a polyalkylene glycol, starch, a starch derivative, a sugar, a sugar derivative, a mono- or a poly-carboxylic acid, and a derivative of a mono- or poly-carboxylic acid.

2. A method of preparing lithium accumulators comprising providing the lithium phosphate composites prepared in accordance with the method of claim 1 as cathode materials in said lithium accumulators.

* * * * *